United States Patent [19]

Amelio

[11] 3,907,220

[45] Sept. 23, 1975

[54] REAR ENGINE REDUNDANT MOUNT

[75] Inventor: Armand Francis Amelio, Yonkers, N.Y.

[73] Assignee: United Aircraft Corporation, East Hartford, Conn.

[22] Filed: Mar. 14, 1974

[21] Appl. No.: 451,661

[52] U.S. Cl. .................. 244/54; 60/39.31; 248/5
[51] Int. Cl.² ........................................ B64D 27/16
[58] Field of Search .......... 244/54; 248/5, 3, 13, 15, 248/18, 20, 358; 60/39.31; 403/119, 151, 152, 161, 162, 163, 165, 133, 113, 114, 115

[56] References Cited
UNITED STATES PATENTS

| | | | |
|---|---|---|---|
| 1,871,957 | 8/1932 | Chryst | 403/152 |
| 2,632,997 | 3/1953 | Howard et al. | 60/39.31 |
| 3,135,487 | 6/1964 | Kottsieper | 248/5 |
| 3,164,342 | 1/1965 | Jacobsen | 248/3 |
| 3,188,808 | 6/1965 | Crooks | 248/5 |
| 3,727,862 | 4/1973 | Kaufhold et al. | 248/5 |

*Primary Examiner*—Trygve M. Blix
*Assistant Examiner*—Galen L. Barefoot
*Attorney, Agent, or Firm*—Maurice B. Tasker

[57] ABSTRACT

An airframe mounted jet engine has a three point support including a front engine mount located on the longitudinal axis of the engine and lateral inboard and outboard rear engine mounts. A redundant rear mount is provided beneath the engine in the vertical plane including the longitudinal axis of the engine which normally does not contribute any significant support for the engine but which, in the event of failure of either one of the two lateral rear mounts, cooperates with the other rear mount to provide a provisional rear support for the engine.

8 Claims, 4 Drawing Figures

REAR ENGINE REDUNDANT MOUNT

BACKGROUND OF THE INVENTION

1. Field of the Invention

This invention relates to engine mounts for jet engines and particularly to an engine mounting system in which a front engine mount is provided on the longitudinal axis of the engine and two laterally spaced rear mounts are provided, one on each side of the engine. With this engine mounting arrangement, failure of either of the lateral mounts can result in the engine being torn from the aircraft. To avoid such an accident, a redundant rear engine mount is provided to cooperate with either of the two lateral mounts to substitute for the mount which has failed.

2. Prior Art Patents

Applicant does not know of any patent showing a redundant rear engine mount in an engine suspension system of the type disclosed herein.

SUMMARY OF THE INVENTION

It is an object of this invention to provide a redundant engine mount for a jet engine which normally does not contribute any significant support for the engine but which, upon failure of one of the primary engine mounts, will cooperate with the remaining engine mounts to adequately support the engine and prevent failure of the engine mount system.

More particularly it is an object of this invention to provide a redundant rear engine mount for an engine supported by a front mount located in the longitudinal axis of the engine and by two rear laterally spaced inboard and outboard mounts which is capable of substituting for either rear mount in the event of a failure of the latter.

It is a further object of this invention to provide a redundant rear mount for a jet engine beneath the longitudinal axis of the engine and between the inboard and outboard rear mounts for the engine.

It is a yet further object of this invention to provide a redundant rear engine mount in such an engine support system including cooperating engine supporting means which normally provide no significant support for the engine but which are capable of supporting the engine in the event of the failure of one of the laterally spaced primary engine mounts.

It is still another object of this invention to provide a redundant rear engine mount which has engine supporting surfaces, normally out of contact, which are brought into engine supporting contact upon failure of a primary rear engine mount.

A further object of this invention is generally to improve engine supporting means for jet engines.

DESCRIPTION OF THE PREFERRED EMBODIMENTS

Figure 1:
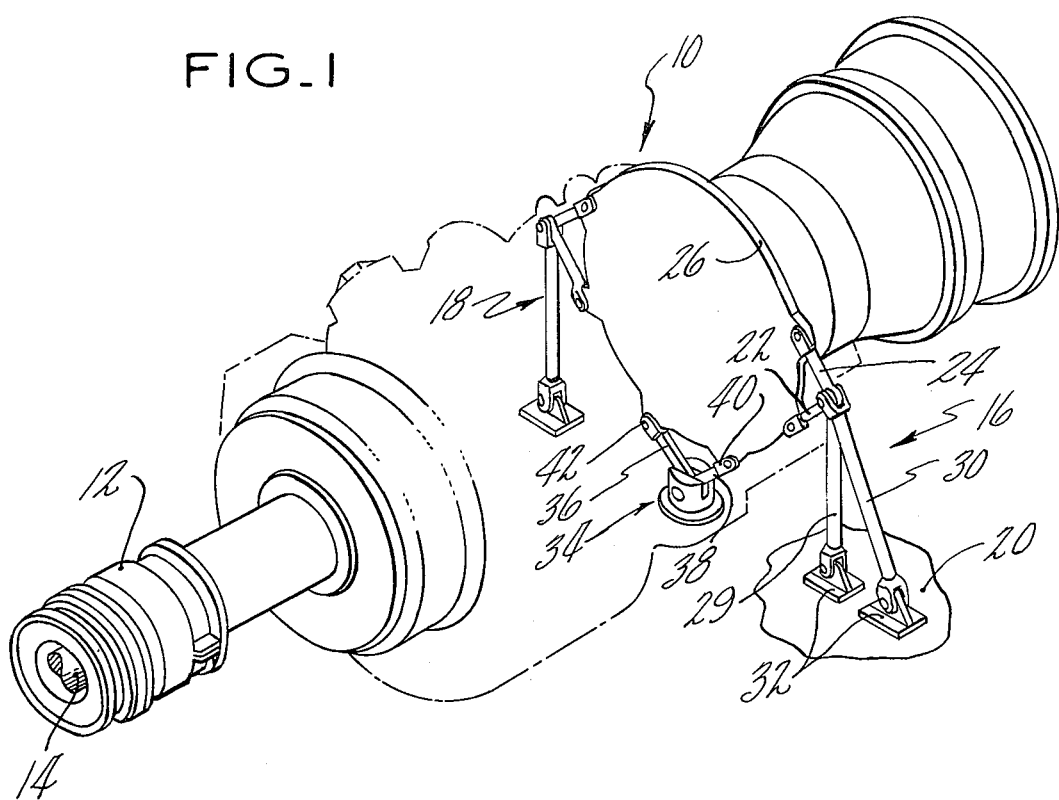
FIG. 1 is a perspective view of an airframe mounted jet engine having the engine mounting structure of this invention, part of the engine being shown in phantom for purposes of illustration.
Figure 2:
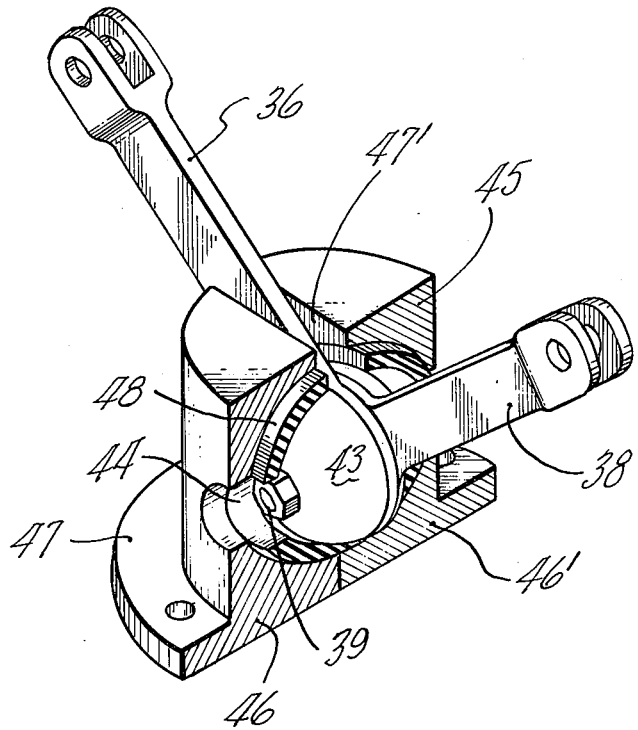
FIG. 2 is an enlarged perspective view of the redundant mount of FIG. 1.

Referring first to FIGS. 1 and 2, a jet engine 10 is supported on an aircraft by a three-point engine mounting system including a front engine mount 12 concentric with main engine shaft 14 having means (not shown) for supporting it on the frame of the aircraft and two laterally spaced rear engine mounts generally indicated at 16 and 18 respectively.

The front engine mount 12, in which the main engine shaft is freely rotatable, supports the engine in all directions except torsional by resilient structure (not shown). The inboard and outboard rear engine mounts 16 and 18 comprise linkage providing rigid support for the engine in lateral, vertical and torsional directions. Herein the engine is shown mounted on the upper surface 20 of an airframe structure. It will be understood that the engine mounting linkage is connected to structural members of the airframe (not shown).

The inboard rear mount 16 comprises two oppositely directed tangential links 22, 24 which are pivotally connected to a peripheral mounting flange 26 of the engine. The other ends of links 22, 24 are connected by a common pivot to the upper ends of a vertical rod 29 and an inclined rod 30, both of which are pivotally connected to mounting pads 32 carried by fixed frame structure. Outboard rear mount 18 is identical except that inclined rod 30 is omitted. Mounts 16 and 18 constitute rigid primary mounts for the rear of the engine and provide the entire support for the engine in this area to resist both torsional forces and radial forces in all directions.

In accordance with this invention, a redundant mount 34 is provided at the rear of the engine which is located beneath the longitudinal axis of the engine and in the same transverse vertical planes as mounts 16 and 18. Mount 34, like mounts 16 and 18, is pivotally connected to engine mounting flange 26 by tangential links 36, 38 and pivot pins 40, 42. The lower ends of links 36, 38 are formed as hemispheres which are so placed side-by-side as to form a spherical end 43 for links 36, 38 when a bolt 39 is extended through aligned holes 44.

Spherical end 43 is received in a two-piece socket assembly 45 having confronting parts 46, 46' and has a base flange 47 by which it is bolted to airplane structure. Passages 47' are provided in parts 46, 46' for links 36, 38 and the spherical socket in assembly 45 is somewhat larger then spherical end 43 to provide a space which is occupied by a very soft elastomer 48 which completely encases spherical end 43.

In the operation of this embodiment of the invention the primary rear engine mounts 16 and 18 provide rigid support for the engine to resist both torsional forces and radial forces in all directions. The redundant, or secondary mount 34 provides no significant support for the engine as long as mounts 16, 18 are operative. Any slight movement of engine 10 in any direction results in compression of the soft elastomer 48. The redundant mount 34 is thus so constructed that no significant support for the engine is provided until the spherical end 43 of rods 36, 38 compresses elastomer 48 sufficiently to permit the engine weight to bottom out the ball end of links 36, 38 against the airframe mounted socket assembly 45. This can happen only if one of the lateral mounts 16, 18 fails. Upon such failure of a primary rear mount, vibration producing freedom in the mount system would result, but its operation may avoid an otherwise certain catastrophe.

Figure 3:
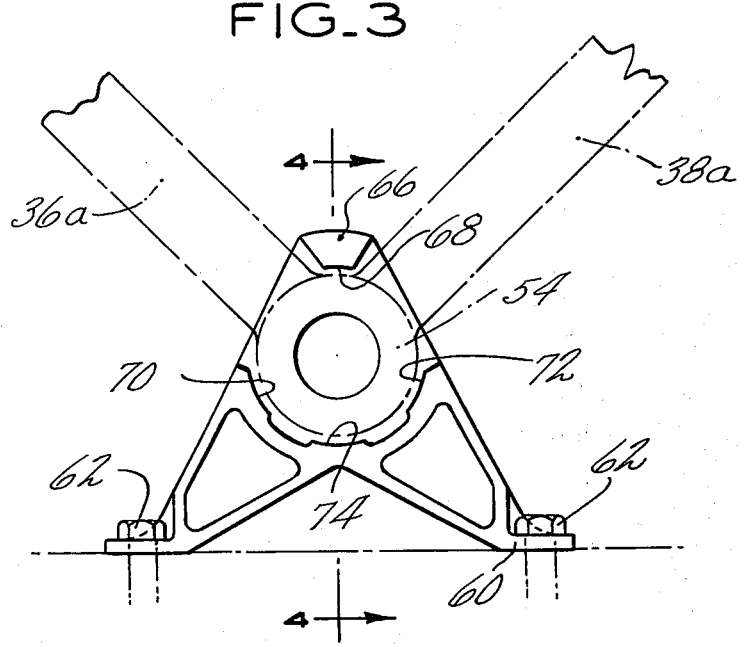
FIG. 3 is a front elevation of a modified construction for the redundant mount.
Figure 4:
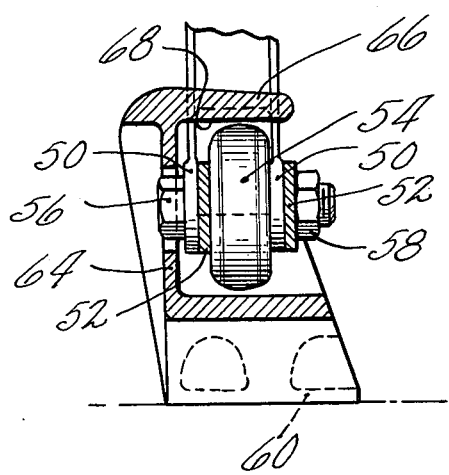
FIG. 4 is a section on line 4—4 of FIG. 3.

In FIGS. 3 and 4 a modified construction of the redundant engine mount is shown. Modified tangential links 36a, 38a are provided which are connected to engine mounting flange 26 at their upper ends, as in the FIGS. 1 and 2 form. The lower ends of these links are so bifurcated, however, that they can be assembled with their lower ends 50, 52 in overlapping relation (FIG. 4) with a roller 54 therebetween. A bolt 56 extends through roller 54 and the overlapping ends of links 36a, 38a. A nut 58 clamps this assembly rigidly together. Member 54, while formed like a roller, has no rolling function in this assembly and is actually a fixed hub.

The housing for hub 54 comprises a base 60 which is fixed to airframe structure (not shown) by bolts 62. Base 60 has a back wall 64 which rises above base 60 and has a forwardly extending top wall 66 overhanging and spaced from the hub which forms an abutment 68 for the hub. Backwall 64 further has forwardly extending side walls forming abutments 70, 72 and 74 for hub 54. Abutments 68, 70, 72 and 74 are all spaced an equal distance from hub 54 and thus limit the movement of the hub from its normal position shown in FIG. 3.

The operation of the FIGS. 3 and 4 embodiment is similar to that shown in FIGS. 1 and 2. So long as the primary engine mounts 16, 18 are both functioning properly, hub 54 remains in the FIG. 4 position in which it is centered between abutments 68, 70, 72 and 74 and the redundant mount provides no support for the engine. If either of the two primary rear mounts 16, 18 should fail, however, the weight of the engine would bottom out the hub 54 which would bear against one or more of the abutments 68, 70, 72 and 74. This will result in limited vibration producing freedom in the mount system but may prevent complete failure of the rear mount system.

From the above description it will be evident that in both embodiments illustrated the redundant mount does not normally provide significant support for the engine but becomes operative to provide engine support only in the event of failure of one of the primary rear engine mounts.

While I have shown and described two embodiments which my invention may assume in practice, I do not desire to be limited to the exact constructions disclosed as modifications will occur to those skilled in this art which fall within the scope of the appended claims.

I claim:

1. A mounting system for the rear end of a jet aircraft engine in which the engine has peripheral mount attaching means, two primary mounts attached to said attaching means on opposite sides of the engine normally providing rigid support for the rear of the engine capable of resisting forces in all directions, and a redundant mount attached to said mount attaching means between said primary mounts which normally provides no significant support for the engine, said redundant mount including a housing member adapted to be attached to aircraft structure and having a socket, a pair of links having convergent ends extended into said socket, said links having their divergent ends attached to said engine mount attaching means, and means for securing the convergent ends of said links together to form a hub within said socket which is loosely encircled by said socket and normally held out of engine supporting relationship with the walls of said socket by said primary mounts.

2. In combination, a jet engine for aircraft including a rear mounting flange extending circumferentially about the engine, two primary rear engine mounts, one on each side of the engine, for supporting the rear of the engine rigidly on aircraft structure against forces in torsional, vertical and lateral directions, and a redundant rear engine mount which normally provides no significant support for the engine, said redundant mount including a base fixed to the aircraft beneath the engine midway between said primary mounts having an enclosure, and a cooperating member within said enclosure normally entirely out of contact with and spaced a substantial distance from the walls of said enclosure, said cooperating member having two links connected thereto which extend tangentially to and are attached to said engine mounting flange.

3. A rear mounting system for an aircraft jet engine having a peripheral rear mount attachment member, said system including two primary mounts located on opposite sides of said engine in the transverse plane including said mount attachment member, said primary mounts having means connecting them to fixed aircraft structure to provide a rigid support for said engine in torsional, vertical and lateral directions, and a redundant mount located beneath said mount attachment member having cooperating engine supporting members, one carried by said attachment member and the other by fixed aircraft structure, said cooperating supporting members being normally completely spaced apart from each other so as to provide no support for the engine until one of said primary mounts fails.

4. A mounting system for the rear end of a jet aircraft engine in which the engine has peripheral mount attaching means, two primary mounts attached to said attaching means on opposite sides of the engine normally providing rigid support for the rear of the engine and capable of resisting forces in all directions, and a redundant engine mount for an aircraft engine comprising a housing having means for securing it to aircraft structure, said housing also having a chamber adapted to receive the convergent ends of a pair of links, the divergent ends of which are adapted to be secured to the engine, the convergent ends of said links being bifurcated and nested in overlapping relation with space between the furcations, a hub forming member occupying the space between said furcations, and means for securing said hub member to said links, the walls of said chamber encircling said hub member and being entirely spaced from said hub member a substantial distance so that the redundant engine mount does not normally contribute to the support of the engine.

5. The combination of claim 4 wherein the hub member is circular and the walls of the chamber include a plurality of concentric arcuate surfaces spaced about the periphery of said hub member which are struck about a radius greater than the radius of said hub member.

6. In combination, a jet aircraft engine including engine mounting means located circumferentially about the rear of the engine, two primary mounts secured to said mounting means, one on each side of said engine for supporting the rear of the engine rigidly on fixed aircraft structure against forces in torsion and in both vertical and lateral directions, and a redundant engine mount which provides no support for the engine until one of said primary mounts fails, said redundant mount including divergent links having their divergent ends connected to said supporting means and having their convergent ends connected to form a hub, and a member carried by fixed aircraft structure for cooperating with said hub and either one of said primary mounts upon failure of the other primary mount, said cooperating member providing abutment surface means encircling said hub in spaced relation to the latter for limiting the movement of said hub in all directions in a vertical plane transverse to the longitudinal axis of said engine.

7. A rear engine mount system for a jet aircraft engine having mount attaching means located peripherally about the engine, laterally spaced inboard and outboard mounts connected to said attaching means and constituting the primary engine mounts which normally provide the entire rear support for the engine, and a redundant engine mount located beneath the engine between said primary mounts, said redundant mount including a hub member and an enclosure member encircling said hub member, one of said members being carried by said engine attaching means and the other by fixed aircraft structure, the inner encircling surface of said enclosure member having a larger diameter than the diameter of said hub member, the latter being spaced a substantial distance from said encircling surface until failure of a primary mount occurs.

8. A rear engine mount system for a jet engine having a mounting flange extending peripherally about the engine, two primary mounts, one on each side of the engine, for supporting the rear of the engine rigidly on aircraft structure against forces in all directions and normally providing the entire support for the rear of the engine, and a redundant engine mount located beneath the engine midway between said primary mounts which normally provides no support for the engine, said redundant mount including cooperating members, one of which is connected to said mounting flange and the other of which is fixed to aircraft structure, said cooperating members comprising a hub member and a socket member encircling and spaced a substantial distance from said hub member so as normally to be entirely out of engine supporting relation.

* * * * *